United States Patent [19]

Hogan

[11] 4,375,763
[45] Mar. 8, 1983

[54] DEVICE FOR DETECTING AND LOCATING LEAKS IN PIPELINES

[75] Inventor: William M. Hogan, Jacksonville, Ark.

[73] Assignee: AGL Corporation, Jacksonville, Ark.

[21] Appl. No.: 196,269

[22] Filed: Oct. 14, 1980

[51] Int. Cl.³ .............................................. G01M 3/28
[52] U.S. Cl. ................................................ 73/40.5 R
[58] Field of Search .................... 73/40.5 R, 49.5; 138/90, 91; 340/605

[56] References Cited

U.S. PATENT DOCUMENTS

| | | |
|---|---|---|
| 1,812,943 | 7/1931 | Granger . |
| 2,481,013 | 9/1949 | Henderson . |
| 2,953,919 | 9/1960 | Potts . |
| 2,998,721 | 9/1961 | Gawlik . |
| 3,048,998 | 8/1962 | Gilreath . |
| 3,132,506 | 5/1964 | Pritchett ........................ 73/40.5 R |
| 3,165,920 | 1/1965 | Loomis . |
| 3,196,686 | 7/1965 | Cole ............... 73/40.5 R X |
| 3,199,598 | 8/1965 | Loomis . |
| 3,750,711 | 8/1973 | Conklin et al. .............. 73/40.5 R X |
| 3,762,446 | 10/1973 | Tungseth et al. ........... 73/40.5 R X |
| 3,817,086 | 6/1974 | Dorgebray . |
| 3,837,214 | 9/1974 | Guest ............................. 73/40.5 R |
| 3,974,680 | 8/1976 | Beaver ............................ 73/40.5 R |
| 4,081,990 | 4/1978 | Chatagnier . |

FOREIGN PATENT DOCUMENTS

| | | | |
|---|---|---|---|
| 2446743 | 4/1976 | Fed. Rep. of Germany ....... 73/49.5 |
| 127859 | 4/1950 | Sweden ............................ 73/40.5 R |

*Primary Examiner*—Edward R. Kazenske
*Assistant Examiner*—Joseph W. Roskos
*Attorney, Agent, or Firm*—Jerry W. Mills

[57] ABSTRACT

A device and method for locating leaks in a pipe are provided. A leak locator probe (10) is provided and is suitable for being transported along a length of pipe. The leak locator probe (10) defines an annular volume (24) within that portion of pipe adjacent the leak locator probe (10). The leak locator probe (10) includes a tube (20) that is closed at both ends and the tube (20) is an aperture (26) that provides an airflow passageway between the interior of the tube (20) and the annular volume (24) that is defined by the leak locator probe (10) and the pipe. During operation, the interior of the tube (20) and the annular volume (24) are pressurized to a pressure in excess of the pressure at the exterior of the pipe, an airflow through the aperture (26) occurs, causing an airflow measuring device (28) to detect an airflow thereby indicating the presence of a leak.

10 Claims, 4 Drawing Figures

DEVICE FOR DETECTING AND LOCATING LEAKS IN PIPELINES

TECHNICAL FIELD

This invention relates to a device and method for detecting and locating leaks in pipe. More particularly, this invention relates to a leak locator probe for insertion into a pipe for detecting leaks therein and related apparatus.

BACKGROUND ART

Several methods and devices for detecting leaks in pipes are known from the prior art.

A method and device for detecting and locating leaks in buried pipelines is disclosed in U.S. Pat. No. 3,817,086 to Dorgebray. That reference discloses a method and device for detecting and locating leaks in buried pipes under pressure that includes a detection scraper piston that is moved with a flow of liquid being transported in the pipeline. The detection scraper piston is driven by the liquid flow in the pipe and utilizes a differential pressure measuring device that includes pressure-sensing elements that can be constituted by strain gauges carried by deformable diaphragms or other pressure transducers having low inertia. The method of leak detection consists in continuously measuring the displacement of the piston from a predetermined zero point as well as the difference between the pressure within the compartment and an intermediate pressure between those prevailing on the upstream and downstream sides of the piston.

There are other methods for detecting leaks in oil pipelines. Some of these methods entail the use of radioactive tracers and consist of passing through the pipeline a volume of fluid in which a radioactive tracer has been dispersed, usually by dissolution, then removing practically the entire tracer content from the pipe by rinsing and, if necessary, by passing the scraper piston within the interior, and finally, in moving a detector piston through the line in order to detect the points at which the tracer has been absorbed in the soil surrounding the pipeline after escaping from the pipeline through leaks during passage of the radioactive fluid. For example, a method of this type is described in French Pat. No. 2,088,609.

Further, attempts have been made to provide an apparatus for detecting and locating leaks in pipelines that includes a detection probe constructed of a tube open at both ends and having an aperture in the wall thereof. An airflow measuring device is utilized to monitor airflow through the aperture. A separate, annular sealing ring is disposed adjacent each end of the tube for defining a sealed annular volume within the pipe adjacent the tube, the annular volume being bounded by the pipe, the tube and the sealing rings. When the detection probe is adjacent a leak in the pipe, a flow of air through the aperture and into the annular volume occurs and is detected by the airflow measuring device indicating the presence of a leak. However, in order to use this apparatus, it is necessary to pressurize the pipe to a pressure in excess of the pressure at the exterior of the pipe adjacent the leak so that air flows from the interior of the pipe to the exterior of the pipe.

Therefore, a need exists for a method and device for detecting and locating leaks in pipelines that cannot be filled with a fluid, or where it is desired to test a pipe without pressurizing the entire length of pipe to be tested.

DISCLOSURE OF THE INVENTION

In accordance with the present invention, a method and device for detecting and locating leaks in pipelines is provided. The apparatus includes a detection probe including a sensor. Electrical circuitry is provided to monitor airflow caused by pipe leaks at a monitoring location outside of the pipe. The probe is dimensioned and adapted for insertion into and through a pipe.

In accordance with apparatus of the present invention, a leak locator probe for use in a pipe is provided that includes a tube having first and second closed ends, with the tube having an aperture in the wall of the tube. An annular sealing ring is disposed on the exterior of each end of the tube for defining a sealed annular volume within a pipe adjacent the probe bounded by the pipe, the tube and the sealing rings, with the aperture providing a fluid passageway between the annular volume and the interior of the tube. An airflow measuring device is disposed adjacent the aperture for detecting an airflow through the aperture. An air supply is utilized for pressurizing the interior of the tube and the annular volume. Thus, the leak locator probe provides its own reference environment for detecting leaks. When the annular volume of the leak locator probe is adjacent a leak or opening in the pipe, a flow of fluid will be detected through the aperture by the airflow measuring device thereby indicating a leak.

In accordance with another embodiment of the apparatus of the present invention, a leak locator probe is provided for detecting leaks in pipes that includes a tube having first and second closed ends with the tube having an aperture in the wall of the tube. An airflow measuring device is disposed adjacent the aperture for detecting an airflow through the aperture. Two pairs of annular sealing rings are provided with one pair being disposed at the ends of the tube and the second set of sealing rings being disposed between the outer sealing rings for defining a central annular volume bounded by the interior sealing rings, the pipe and the tube with two outer annular volumes being defined at each end of the probe by an outer sealing ring and an inner sealing ring. Holes are provided through the tube wall to allow air to flow between the central portion of the tube and the outer annular volumes thereby providing a larger volume of fluid that is available to pass through the aperture connecting the central annular volume with the tube center when a leak is adjacent the central annular volume. A check valve may be provided for allowing airflow through the sensing aperture only in a direction from the tube interior into the central annular volume to minimize false readings and to improve the accuracy of leak detection.

In accordance with one embodiment of the invention, a temperature stabilized heater is utilized as the airflow measuring device. The electrical circuitry provided includes a voltage source for driving the temperature-stabilized heater, a differential amplifier for amplifying the signal from the heater and voltage divider for zeroing the amplifier. The output of the differential amplifier inputs into a milliamp meter for monitoring the current drawn by the temperature-stabilized heater. When an airflow impinges the heater, it draws additional current to maintain itself at a constant elevated temperature. By correlating the amount of current drawn by the heater with a known airflow, the airflow through the aperture caused by a leak can be determined by monitoring the current supplied to the heater. In accordance with one embodiment of the circuitry, the output of the first amplifier becomes the input for another amplifier that is utilized as a comparator saturating amplifier, such that when its output rises above a certain threshold level, it will activate a transistor to thereby provide current to a buzzer. The threshold value is calibrated such that it corresponds to a particular volumetric flow rate through the aperture.

In accordance with another aspect of the present invention, a method is provided for locating pipe leaks. The method includes providing a bounded, transportable reference environment adjacent the interior of the pipe that comprises air or some other fluid at a pressure greater than the pressure at the exterior of the pipe. As the reference environment traverses the pipe, airflow from the reference environment is monitored. The detection of airflow from the reference environment indicates the presence of a pipe leak. The size of the reference environment is relatively small relative to the pipe length to permit the leak to be accurately located.

BRIEF DESCRIPTION OF THE DRAWINGS

The invention can be more completely understood by reference to the accompanying drawings in which:

FIG. 4 is a schematic diagram of electrical circuitry useful with the present invention to locate leaks in pipe.

DETAILED DESCRIPTION

In accordance with the present invention, an apparatus and method for detecting fluid leaks in a pipe is provided.

Figure 1:
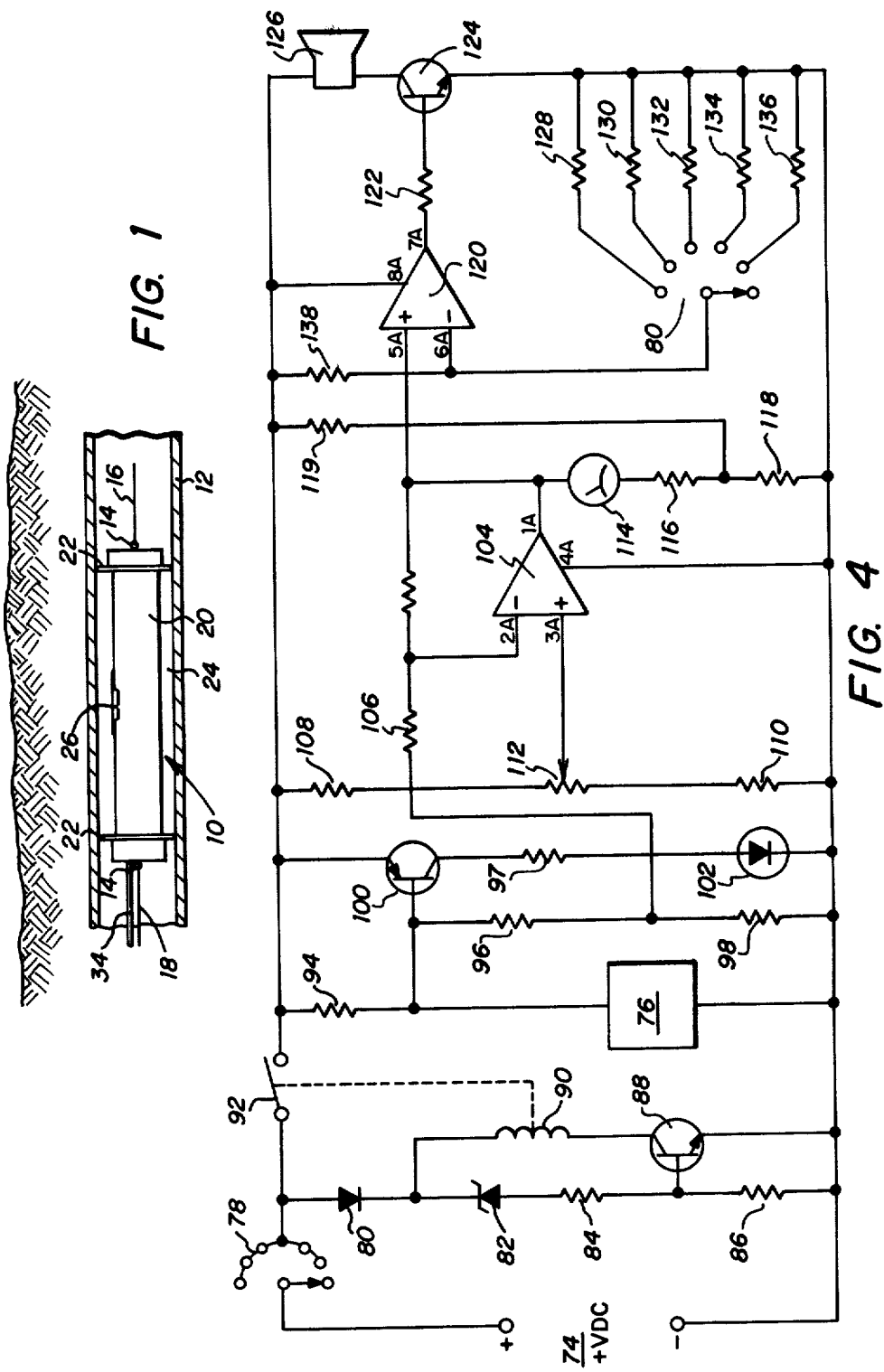
FIG. 1 is a side elevational view of a leak locator probe in accordance with the present invention in position within a pipe to be tested.
Figure 2:
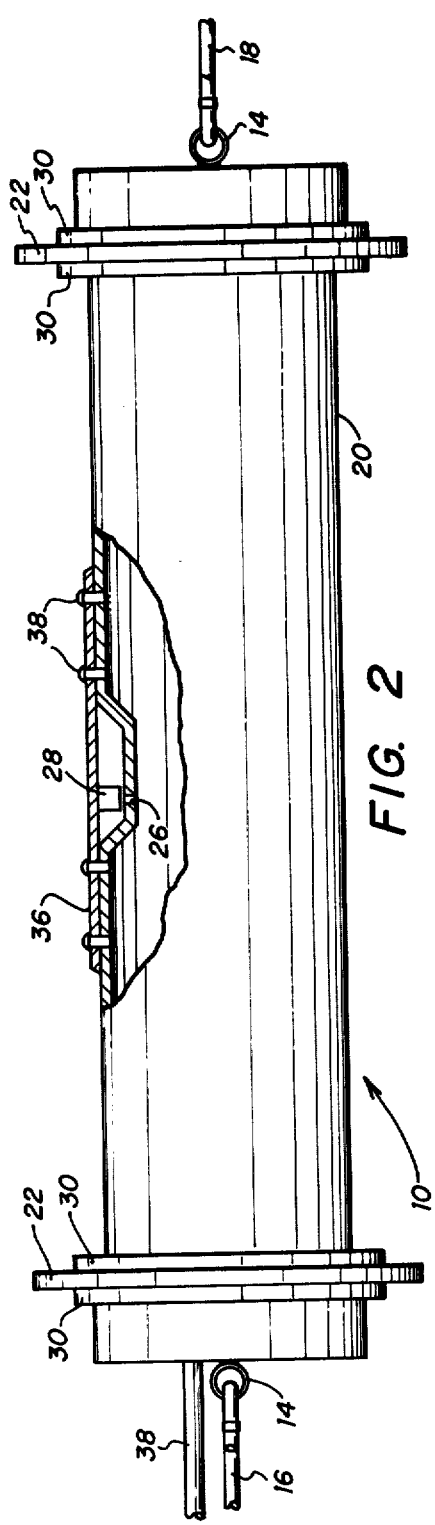
FIG. 2 is a side elevational view, partly in section, of one embodiment of a leak locator probe in accordance with the present invention.

Referring to the drawings in general, and in particular to FIGS. 1 and 2, there is depicted a leak locator probe 10 in accordance with the present invention shown in position inside a pipe 12 for detecting leaks therein. Leak locator probe 10 preferably includes a suitable provision for attachment of a cable to either end thereof such as a separate eye 14 at each end of leak locator probe 10 to facilitate movement through a pipeline. As shown in FIG. 1, leak locator probe 10 can be moved along the length of pipe 12 in either direction by applying a force through a cable 16 or 18 which are attached to opposite ends of leak locator probe 10 via eyes 14. Leak locator probe 10 is constructed of a tube 20. Tube 20 is preferably a thin-walled tube and may be constructed from any suitable material and may be metallic or plastic, for example. Leak locator probe 10 further includes a separate sealing ring 22, disposed on the exterior of tube 20 for defining an annular volume 24 within pipe 12 adjacent leak locator probe 10. Annular volume 24 is bounded by pipe 12, tube 20 and sealing rings 22. Preferably, annular sealing rings 22 are constructed of rubber and in the most preferred embodiment, the annular sealing rings are constructed of a three-ply cloth-inserted synthetic butyl rubber marketed by the Buckeye Rubber Company of Lima, Ohio. Annular sealing rings 22 provide a seal between the leak locator probe and pipe. An aperture 26 is located in the wall of tube 20 to provide a fluid passageway between annular volume 24 and the interior portion of tube 20. An airflow sensing device 28 is disposed adjacent aperture 26 and is utilized to measure volumetric airflow through aperture 26, as will be hereinafter described in greater detail. Preferably, the airflow sensing device is a temperature stabilized heater, which will be hereinafter described in greater detail.

As previously described, sealing rings 22 are utilized to provide a seal between pipe 12 and leak locator probe 10. Preferably, a pair of stiffening discs 30 are utilized to provide support for each sealing ring 22 for controlling the amount of flexing of sealing rings 22. Each pair of stiffening discs is disposed on tube 20 with one sealing ring 22 therebetween. A separate end cap 32 is disposed on each end of tube 20. Each end cap 32 has a closed end so that when end caps 32 are in position on the ends of leak locator probe 10, the ends of the tube 30 are closed. A provision is made in one of end caps 32 to allow an insertion therethrough of a pressurized airline 34 so that the interior of tube 20 and annular volume 24 can be pressurized during operation of leak locator probe 10. Airline 34 can also be utilized as a towing cable. While not a limitation on the present invention, generally the air pressure supplied is between about 0.5 and 2 psig for most applications. Preferably, there is an indentation in the wall of tube 20 where aperture 26 is located to provide a recessed area in which airflow sensing device 28 can be mounted. A cover 36 may be provided to protect airflow sensing device 28. Cover 36 may be secured to tube 20 by any suitable means, such as rivets 38. Cover 36 does not prevent airflow through aperture 26 and into annular volume 24.

Figure 3:
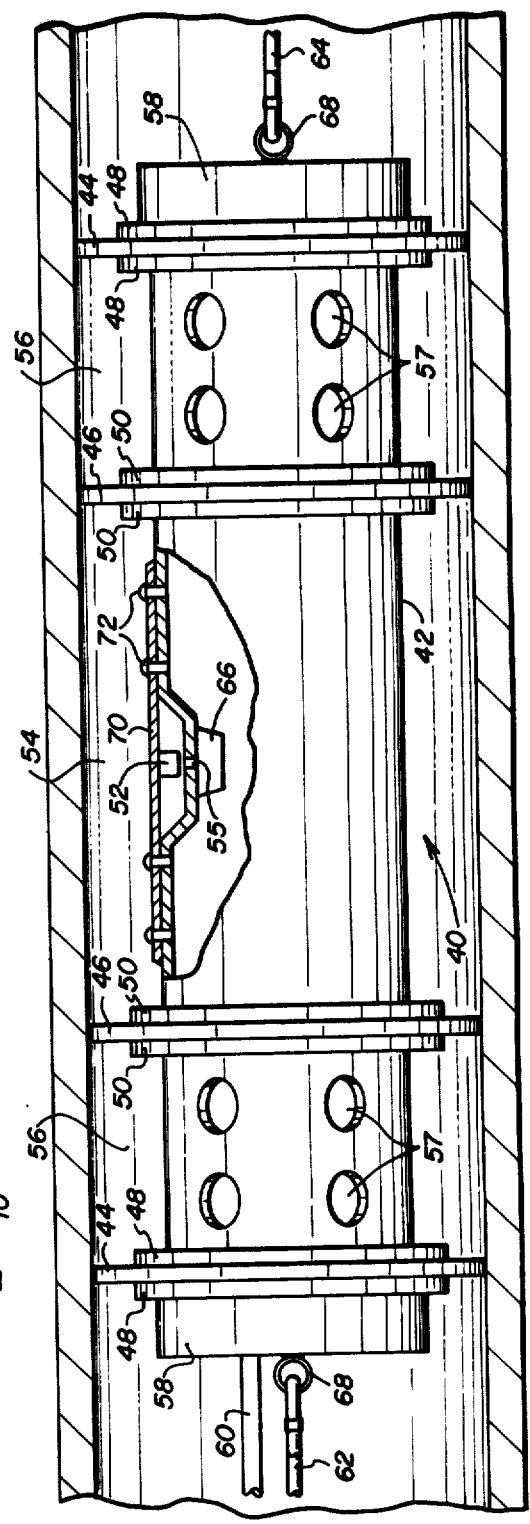
FIG. 3 is a side elevational view, partly in section, of another embodiment of a leak locator probe in accordance with the present invention.

Another embodiment of the apparatus of the present invention is depicted in FIG. 3. A leak locator probe 40 is provided for detecting leaks in pipes that includes a tube 42, exterior sealing rings 44, interior sealing rings 46, exterior stiffening rings 48, interior stiffening rings 50 and an airflow sensing device 52. An aperture 55 in the wall of tube 42 provides a fluid passageway between the interior of tube 42 and central annular volume 54. Interior sealing rings 46 define a central annular volume 54 that is bounded by tube 42, interior sealing rings 46 and the pipe being tested. Thus, interior sealing rings 46 form a seal with the pipe. At each end of leak locator probe 40, an exterior sealing ring 46 is disposed and with an interior sealing ring 44 forms an exterior annular volume 56. Apertures 57 are provided through tube 42 to provide at least one fluid passageway at each end of tube 42 between the interior of tube 42 and exterior annular volume 56. An end cap 58, having a closed end, is utilized at each end of tube 42 for sealing the ends thereof. At least one of end end caps 58 contains an aperture to allow insertion of an airline 60. Each end cap 58 is constructed to permit attachment of cables 62 and 64 for allowing leak locator probe 40 to be pulled in either direction through a pipe, through the use of eyes 66 or any other suitable means. As provided for in leak locator probe 10, leak locator probe 40 may also include a cover 70 secured by rivets 72 to protect airflow sensing device 52 without preventing airflow through aperture 26.

The operation of leak locator probes 10 and 40 will be described utilizing a temperature-stabilized heater as airflow sensing devices 28 and 52. The resistance values of the resistors are not provided in FIG. 4.

During operation, leak locator probe 40 is placed within the pipe to be tested with airline 60 and cables 62 and 64 connected thereto. Airline 60 provides a source of compressed air for pressurizing the interior portion of tube 42 and central annular volume 54 and exterior annular volumes 56 to a pressure in excess of the air pressure at the exterior of the pipe. When central annular volume 54 is adjacent a pipe leak, an airflow occurs from the interior of tube 42 through aperture 55 impinging airflow sensor (heater) 52 and exiting through the pipe leak thereby causing heater 52 to draw additional current with the amount of current drawn calibrated to correspond with a particular airflow through aperture 55. In the preferred embodiment of leak locator probe 40, a check valve 66 is provided to prevent airflow from central annular volume 54 through aperture 55 and into the interior portion of tube 42. If check valve 66 is not provided, then when either of exterior annular volumes 56 are adjacent a pipe leak, this could cause an airflow from central annular volume 54 across heater 52 and through aperture 55 thereby causing heater 52 to draw additional current. While this would indicate the presence of a pipe leak, the location would not be identified as accurately as when the leak is adjacent central annular volume 54. The operation of leak locator probe 10 is similar to the operation of leak locator probe 40. Thus, leak locator probes 10 and 40 provide a bounded pressurized reference environment having an airflow sensor therein to monitor airflow from the reference environment. Further, the volume of airflow can be correlated to provide a determination as to the proportions of the leak and also the location of tributaries or tie-in lines of the pipe being tested.

Referring to FIG. 4, there is depicted a schematic diagram of the electrical circuitry advantageously used with leak locator probes 10 and 40 of the present invention for measuring fluid flow through apertures 26 and 55 to detect leaks within a pipe when a temperature stabilized heater is utilized as airflow sensor 28 or 52. The circuitry is designed for use with a positive direct current source 74, such as an automobile battery. A low voltage cutoff is provided between heater 76 and voltage source 74. A voltage regulator circuit is provided to regulate the voltage supplied to heater 76. A rotary power switch 78 is mounted on a common pole with a rotary switch 81 that is calibrated in the rate of airflow through aperture 28 of probe 10 or aperture 55 of probe 40. Diodes 80 and 82, resistors 84 and 86, transistor 88, induction coil 90, and relay 92 are connected as shown in FIG. 4 to provide a voltage supply for heater 76. When air impinges on heater 76, it will require more current to maintain itself at its reference temperature thereby causing a large voltage drop across resistor 94. There is also a small change in the voltage drop across heater 76. This voltage drop is sensed by resistors 96 and 98 that are connected in parallel and in series with heater 76. When the voltage drop across resistor 94 is large enough, transistor 100 is activated thereby energizing a light emitting diode 102. Light emitting diode 96 is mounted on a control panel and its activation indicates that heater 76 is drawing a maximum current indicating a very large airflow across heater 76. A differential amplifier 104 obtains an input between resistors 96 and 98. A resistor 106 is mounted in series with the input to differential amplifier 104 and a tie-on point between resistors 96 and 98. Resistors 96, 97 and 98 are biasing resistors for transistor 100.

Resistors 108 and 110 and variable resistor 112 are utilized as a voltage divider network for the other input to differential amplifier 104. This voltage divider network is utilized to zero the output to differential amplifier 104. The output of differential amplifier 104 is fed to a milliamp meter 114. Resistors 116, 118 and 119 are connected with meter 114 to bring that side of milliamp meter 114 to a voltage slightly above ground. The output of amplifier 104 goes into the input of a differential amplifier 120. A resistor 121 is connected between the inputs of differential amplifiers 104 and 120. Amplifier 120 is utilized as a comparator saturating amplifier such that when its output, directed through resistor 122, exceeds a certain threshold level, it will activate transistor 124 thereby providing a power source to buzzer 126. The activation of buzzer 126 transmits an audio signal. Buzzer 126 may be mounted directly on leak locator probe 10 or 40 or buzzer 126 may be mounted at a remote location. The threshold value necessary to trigger transistor 124 can be adjusted by means of rotary switch 80 from which one of five resistors, 128, 130, 132, 134 and 136 may be selected. Each resistor 128, 130, 132, 134 and 136 is calibrated to correspond to an output from differential amplifier 120 that corresponds with a particular airflow rate through aperture 26 or 55. A resistor 138 is also provided as a biasing resistor for amplifier 120.

In accordance with the preferred embodiment of the circuit, the heater utilized is sold by the National Semiconductor Company, Part No. LM399. LM399 is a precision, temperature-stabilized monolithic zener and heater that requires a relatively low power for stabilization at a constant temperature. Only the heater portion of the circuitry is utilized. Generally this device is sold with insulating material that encloses the device. As utilized in accordance with the present invention, this insulation is removed from the device prior to use in the leak locator probe to reduce any lag time that would be caused by the insulation when, for example, air impinges the device. Preferably, transistor 100 is Motorola Part No. 2N3906, transistor 88 is Motorola Part No. 2N3904, transistor 124 is Motorola Part No. 2N3904 and amplifiers 104 and 120 are preferably on a single chip, National Semiconductor Part No. LM358, with the pin positions 1-8 being identified in FIG. 4 as reference numerals 1A-8A.

In accordance with the invention, other systems may be utilized for transmitting a signal that is proportional to the airflow to a monitoring location at a point exteriorly of the pipe. For example, optical, ultrasonic or audio signals can be used. The audio signal provided by buzzer 126, for example, can be transmitted through the length of pipe, the pipe acting as a waveguide. A microphone can be located at one end of the pipe for receiving the audio signal.

The apparatus and method of the present invention is particularly suitable for detecting pipe leaks where the entire pipe cannot be pressurized such as when there are numerous tie-in points or tributaries to the pipe, for example.

While this invention has been described with respect to its preferred embodiments, it is apparent that numerous changes, modifications and rearrangements are possible and are intended to be within the scope of the appended claims.

I claim:

1. A leak locator probe for use in detecting leaks in a pipe comprising:

a housing having a first closed end and a second closed end with an aperture located in the wall of said housing;

airflow measuring means disposed adjacent said aperture for measuring airflow through said aperture;

means disposed on the exterior of said housing for providing a boundary that defines a first sealed volume defined by the exterior of said housing, the interior wall of said pipe and said boundary, said volume located such that said aperture provides a fluid passageway between said sealed volume and the interior of said housing;

said means for providing a boundary including a first pair of annular sealing rings;

a pair of annular stiffening rings for said first sealing rings, said stiffening rings disposed on either side of and adjacent each of said first annular sealing rings for reducing the flexing of said sealing rings, said stiffening rings having an outer diameter less than the outer diameter of said first sealing rings;

a second pair of annular sealing rings disposed on the exterior of said housing for defining a second and third sealed volume, said second volume being defined by one of said sealing rings of said first pair of annular sealing rings and one sealing ring of said second pair of annular sealing rings, said housing and the pipe, said third sealed volume being defined by the other sealing rings of said first and second pairs, said housing and pipe, said housing having at least one aperture in said wall for providing a fluid passageway between said second sealed volume and the interior of said housing and at least one aperture in the wall of said housing for providing a fluid passageway between said third sealed volume and the interior of said tube; and check valve means disposed adjacent said aperture that provides a fluid passageway between said first volume and the interior of said housing for allowing fluid flow only in the direction from the interior of said housing into said first sealed volume.

2. The leak locator probe as recited in claim 1 wherein said airflow measuring means is a temperature-stabilized heater.

3. The leak locator probe as recited in claim 2 further comprising means for transmitting the signal from said heater when the probe is in the pipe to a monitoring location located exteriorly of the pipe.

4. The leak locator probe as recited in claims 1 or 2 further comprising means for allowing a cable to be attached to the leak locator for pulling the leak locator through the pipe.

5. The leak locator probe as recited in claim 1 further comprising:
means for transmitting the signal from said airflow measuring means when the probe is in the pipe to a monitoring location located exteriorly of the pipe.

6. The leak locator probe as recited in claim 5 wherein said means for transmitting includes an audio output means located on the leak locator probe.

7. The leak locator probe as recited in claim 6 wherein said audio output means is an audio buzzer means located on the probe.

8. The probe as recited in claim 6 further comprising microphone means located at one end of the pipe for receiving an audio signal from the audio output means.

9. The leak locator probe as recited in claims 5 or 3 wherein said means for transmitting includes a magnetic telemetry signal system.

10. The leak locator probe as recited in claim 5 wherein said signal is an optical signal.

* * * * *